(12) United States Patent
Rapp et al.

(10) Patent No.: US 8,480,974 B2
(45) Date of Patent: Jul. 9, 2013

(54) DEVICE FOR CONTROLLING THE FLOW OF FLUIDS THROUGH MICROFLUIDIC CHANNELS

(75) Inventors: Bastian Rapp, Karlsruhe (DE); Achim Voigt, Eggenstein-Leopoldshafen (DE); Leonardo Carneiro, Belo Horizonte (BR)

(73) Assignee: Karlsruher Institut fuer Technologie, Karlsruhe (DE)

( * ) Notice: Subject to any disclaimer, the term of this patent is extended or adjusted under 35 U.S.C. 154(b) by 372 days.

(21) Appl. No.: 12/844,486

(22) Filed: Jul. 27, 2010

(65) Prior Publication Data

US 2011/0023971 A1 Feb. 3, 2011

(30) Foreign Application Priority Data

Jul. 30, 2009 (DE) .................. 10 2009 035 292

(51) Int. Cl.
*F16L 53/00* (2006.01)
(52) U.S. Cl.
USPC ........... 422/503; 422/502; 422/504; 422/505; 422/506; 422/507; 422/537; 436/180
(58) Field of Classification Search
USPC .......................... 422/502–507, 537; 436/180
See application file for complete search history.

(56) References Cited

U.S. PATENT DOCUMENTS

| | | |
|---|---|---|
| 3,599,525 A | 8/1971 | Klann |
| 4,989,626 A | 2/1991 | Takagi et al. |
| 5,775,371 A | 7/1998 | Pan et al. |
| 5,988,197 A | 11/1999 | Colin et al. |
| 6,202,687 B1 | 3/2001 | Park |
| 6,387,234 B1 * | 5/2002 | Yeung et al. .................. 204/451 |
| 6,575,188 B2 | 6/2003 | Parunak |
| 7,143,785 B2 | 12/2006 | Maerkl et al. |
| 7,766,033 B2 | 8/2010 | Mathies et al. |
| 2002/0092363 A1 * | 7/2002 | Jorgenson et al. ......... 73/861.95 |
| 2005/0247357 A1 * | 11/2005 | Welle ............................. 137/828 |
| 2010/0252123 A1 | 10/2010 | Mathies et al. |

FOREIGN PATENT DOCUMENTS

| | | |
|---|---|---|
| DE | 69603999 T2 | 12/1999 |
| DE | 102007032951 A1 | 1/2009 |
| EP | 0368306 B1 | 4/1995 |
| EP | 0731303 B1 | 9/1999 |
| WO | WO 2007109375 A2 | 9/2007 |

* cited by examiner

Primary Examiner — Brian R Gordon
Assistant Examiner — Shogo Sasaki
(74) Attorney, Agent, or Firm — Leydig, Voit & Mayer, Ltd.

(57) ABSTRACT

A device for controlling a flow of fluids through $n=2^m$ microfluidic channels, m being a natural number>0 includes a substrate having the microfluidic channels therein. Each channel includes m contact points. A respective heating element corresponds to each contact point. Each of a plurality of m pairs of conductor paths corresponds to a respective contact point of each of the microfluidic channels. Each pair includes a first conductor path that is in contact with a respective first half of the heating elements that correspond to the respective contact points of each microfluidic channel and a second conductor path that is in contact with a respective second half of the heating elements that correspond to the respective contact points of each microfluidic channel. A respective control line corresponds to each of the m pairs of conductor paths, where each control line is operable to actuate the corresponding pair of conductor paths with a switching status TRUE or a switching status FALSE. A cooling element is configured to control fluid received in the microfluidic channels.

13 Claims, 3 Drawing Sheets

DEVICE FOR CONTROLLING THE FLOW OF FLUIDS THROUGH MICROFLUIDIC CHANNELS

CROSS REFERENCE TO RELATED APPLICATIONS

This application claims priority to German Patent Application No. DE 10 2009 035 292.9, filed on Jul. 30, 2009.

FIELD

The invention relates to a device for controlling the flow of fluids through microfluidic channels; it also relates to a method for its operation and to its use.

BACKGROUND

In many applications of microfluidic systems, it is necessary to control a very large number of microfluidic channels in order to control various analysis or synthesis steps in a system or in a process.

German patent application DE 10 2007 032 951 A1 describes a microfluidic system that uses a mediating medium. Such structures, referred to as indirect microfluidic systems, are suitable for applications in critical analytical applications, for example, in biomedical technology, thanks to the fact that they are disposable and that expensive microfluidic components can be operated contamination-free. However, such systems require a large number of 2/2-way valves, that is to say, valves that block or free a microfluidic channel. The number of channels to be controlled here can easily range from a few dozen to more than a hundred.

Such systems cannot be operated reliably by either small implemented conventional valves or by directly controlled micro-valves, since the control technology becomes very complex with such a large number of valves. Moreover, the structural size of such systems also quickly increases disproportionately, U.S. Pat. No. 6,575,188 B2, European patent application 0 368 306 B1 and European patent application 0 731 303 B1 describe individual thermal valve cells that each have a heat source and a heat sink. The opening and closing of a microfluidic channel is carried out by selectively switching on and off the heat source or the heat sink. For purposes of switching off, the microfluidic channel is closed in a defined area by local freezing, and for purposes of switching on, it is opened again by local heating and the resultant melting of the icing.

These systems call for a 1-to-1 control, that is to say, the valves are each opened and closed again individually, so that each valve can be associated with its own control line. The advantage in comparison to systems that are based on moving mechanical components such as membranes or piezo actuators is that the thermal valves work passively, as a result of which they are much more sturdy, less error-prone and thus more stable during operation. Particularly in terms of manufacturing tolerances and fits, thermal valves are superior to the valves used in conventional valve technology. The creation of the blocking volume intrinsically has a precise fit, so that no valve leaks are possible due to inaccurately fitting shapes, which is a major problem especially in conventionally designed, miniaturized microfluidic valves. In particular, a valve is configured in such a way that the heat source and the heat sink are uncoupled from the microfluidic channel. The microfluidic channel is then independently closed off and configured on a separate component, the heat source and the heat sink can be used again when the microfluidic channel is disposed of, for example, because it is contaminated or clogged. Furthermore, these valves are also less expensive to manufacture, since they do not contain any actual valve components. Rather, the valve function is achieved by substances already present in the system, namely, the content of the microfluidic channel. Another advantage of these systems is that they are independent of the selected material of the microfluidic channel. The material can be adapted to the required application in each case and can be made, for example, of plastic, ceramic or silicon. Regardless of the selection of the material, the described thermal valve technology can be transferred to all materials since the valve uses only the content of the channel for the valve function.

In the described state, thermal valves can be used in order to open or to close channels in certain places in microfluidic systems. However, if the number of channels to be controlled is very large (in the range from hundreds to thousands), then thermal valves would be as unsuitable as any other valve that is configured for 1-to-1 control. The control resources needed for such a system are simply too great.

U.S. Pat. No. 7,143,785 B2 describes a fluidic multiplexer on the basis of membrane valves that is actuated by compressed air. Furthermore, U.S. Pat. No. 3,599,525 A, U.S. Pat. No. 5,775,371 A and U.S. Pat. No. 6,202,687 B1 describe systems that can carry out highly complex control tasks by means of compressed-air control. A drawback here is that even though the concept of multiplexing allows a reduction of the control lines, at the same time, it intrinsically increases the number of actually present valves. For example, a 3-bit fluidic multiplexer results in a number of 8 controllable microfluidic channels. However, these channels each have three intersections with the control lines at which the channel is to be configured so that it can be switched. Each of these intersections is thus effectively a single valve. Thus, for a 3-bit fluidic multiplexer, this results in a total sum of 3×8=24 individual valves. If these valves are configured as conventional micro-mechanical valves, then the number of requisite valves is tripled in comparison to a 1-to-1 control. With a higher number of control lines, this value is multiplied by an even greater factor. Another drawback of the compressed-air control is that the actual valve is not made up only of the micro-technically configured valve component. The pressure exerted on the fluidic valves, in turn, has to be controlled by a pneumatic valve, as a result of which the number of actually present valves is further increased, especially since the two valve types, that is to say, fluidic valves in the microfluidic component and pneumatic valves outside of the fluidic component, are of a different design. Furthermore, only very few materials can be used to make the described micro-technical valves. They require a very soft material, especially a soft polymer, e.g. polydimethylsiloxane (PDMS). If the application calls for another material, for instance, metal or ceramic, then the valve function cannot be achieved in this manner.

Therefore, a fluidic multiplexer in classic valve technology increases the error-proneness of the system, since for every single valve, a certain probability exists that it will come out of the production process with a defect. For the fluidic multiplexer described in U.S. Pat. No. 7,143,785 B2, a total sum of over 2000 individual micro-mechanical valves is needed, that is to say, even at a reject rate of just 0.1%, this would already amount to two valves in this system. Here, it should be kept in mind that already just one defective valve will put the entire multiplexer out of operation. The reduction of the complexity of the actuation is only achieved at the expense of the reliability of the system.

Moreover, all of the described fluidic multiplexers described have a problem: the structure of the valves and of the actuator system is intrinsically linked to the microfluidic structure. If the microfluidic channel structure is to be disposed of, for example, because the structure is contaminated or clogged, the entire actuator system also has to be disposed of, since it is permanently joined to the microfluidic structure. This condition further reduces the reliability of these systems and makes them unsuitable particularly for applications that call for a frequent replacement of the channel structure, especially biomedical applications, which require that all of the system components that have ever come into contact with an analyte have to be replaced after each measurement.

SUMMARY

In an embodiment, the present invention provides device for controlling a flow of fluids through $n=2^m$ microfluidic channels, m being a natural number>0. The device includes a substrate having the microfluidic channels therein. Each channel includes m contact points. A respective heating element corresponds to each contact point. Each of a plurality of m pairs of conductor paths corresponds to a respective contact point of each of the microfluidic channels. Each pair includes a first conductor path that is in contact with a respective first half of the heating elements that correspond to the respective contact points of each microfluidic channel and a second conductor path that is in contact with a respective second half of the heating elements that correspond to the respective contact points of each microfluidic channel. A respective control line corresponds to each of the m pairs of conductor paths, where each control line is operable to actuate the corresponding pair of conductor paths with a switching status TRUE or a switching status FALSE. A cooling element is configured to cool fluid received in the microfluidic channels.

BRIEF DESCRIPTION OF THE DRAWINGS

Exemplary embodiments of the present invention will be explained in greater detail below with reference to the drawings, in which.

DETAILED DESCRIPTION

Figure 1:
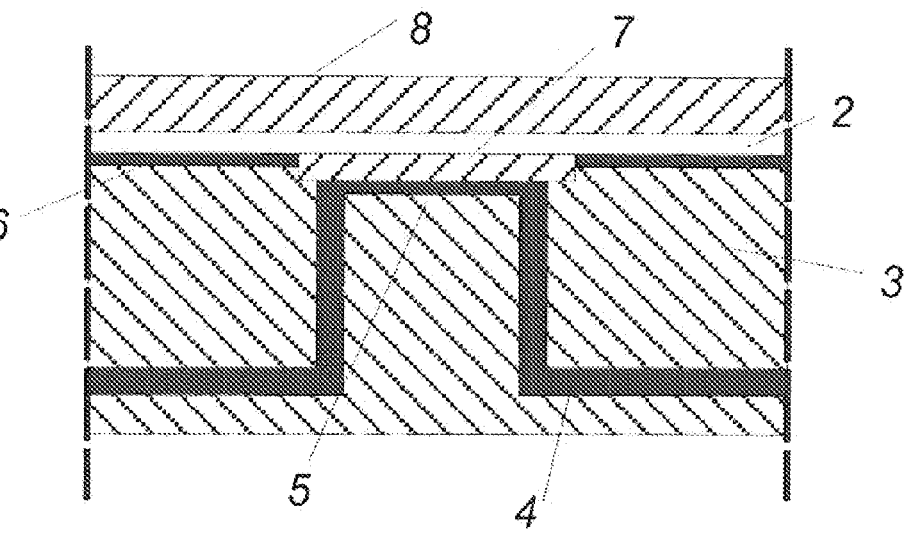
FIG. 1 shows a structure of an individual thermal valve cell.

An aspect of the present invention is to provide a device for controlling the flow of fluids through microfluidic channels, a method for its operation and for its use, all of which do not have the above-mentioned drawbacks and limitations.

In particular, a device is provided that makes it possible to control a large number of microfluidic channels with the smallest possible number of control lines.

A device according to an embodiment of the invention for controlling the flow of fluids through $n=2^m$ microfluidic channels, wherein m is a natural number>0, and the channels are incorporated into a substrate and configured in such a way that each channel has m contact points with one heating element in each case. The heating elements may be configured as an ohmic resistor or as a diode.

Here, for the first half of the channels, for each of the m contact points, the heating element that is in contact with this particular channel is connected by a first conductor path to a heating element of the other channels and, for the other half of the channels, for each of the m contact points, the heating element that is in contact with this particular channel is connected by a second conductor path to a heating element of the other channels. Preferably, the channels are configured in such a way that, at a contact point, they are open with respect to the printed circuit board, or else they are closed with respect to the printed circuit board by means of a thin wall that has a low thermal capacitance.

Moreover, a first conductor path and a second conductor path, combined in pairs, each form a control line for which either only the switching status TRUE or only the switching status FALSE can be selected.

Fluidic multiplexers make it possible to switch a large number of fluidic channels by means of a small number of control lines. In doing so, they make use of a concept that is known from electronics. Multiplexers switch a large number of signal lines with a small number of control lines, whereby the two quantities are in an exponential relationship with each other:

number of signal lines=2 squared(number of control lines)

Consequently, a 3-bit fluidic multiplexer would be capable of switching $2^3=8$ microfluidic channels, a 10-bit fluidic multiplexer as much as $2^{10}=1024$. The concept can readily be applied to any desired number of control lines, as a result of which thousands of microfluidic channels can easily be controlled.

Finally, the conductor paths and the heating elements are situated on a printed circuit board that is adjacent to a cooling element. The cooling element is preferably configured in the form of a cooling fin structure with a connected heat pipe, in the form of a ventilation system or in the form of a Peltier element.

A device according to the invention can be operated by the following method.

According to the invention, a passive implementation of a microfluidic multiplexer based on thermal valve technology is being proposed. The function of opening and closing a microfluidic channel is not achieved by a mechanically movable component, optionally a micro-technically produced component, but rather by the local freezing and opening of a channel by means of a heat source and a heat sink.

The method according to the invention for controlling the flow of a fluid through $n=2^m$ microfluidic channels, wherein m is a natural number>0 and the channels are created into a substrate, comprises the steps a) through c).

According to step a), first of all, the microfluidic channels are frozen at their contact points with the heating elements. The contact points thus each form a closing element for the microfluidic channels.

Then, according to step b), a digital signal is applied to the control lines, whereby each control line assumes only either the switching status TRUE or the switching status FALSE, so that only one of the two associated conductor paths is energized at a time. Only when each of the intersections of the individual channels is opened with each of the control lines by applying the switching status TRUE does a heating element at the appertaining intersection thaw the microfluidic channel at the appertaining contact point, and thus the corresponding microfluidic channel opens, as a result of which a flow could be established from the inlet of the appertaining microfluidic channel to the outlet of the corresponding microfluidic channel.

Finally, according to step c), a flow is established from the inlet of the appertaining microfluidic channel to the outlet of the corresponding microfluidic channel, preferably by means of one or more external pumps.

A device according to the invention can be used to switch highly complex microfluidic systems with hundreds to thousands of microfluidic channels.

Moreover, this device also lends itself for controlling gas flows. If the fluidic multiplexer is in operation and if one of the specified microfluidic channels that is to be switched is open, then not only a fluid but also a gas can be conveyed through this channel.

The invention has especially the advantages listed below.

Thanks to the exponential relationship between control lines and microfluidic channels, which is intrinsic to multiplexing, the device according to the invention is superior to any valve that is operated by individual control. Complex microfluidic systems that are switched by valves that are operated by individual control cannot be implemented with such a level of compactness; the numerous feed lines for the valve control alone would enlarge the system to an unacceptable extent.

The device according to the invention needs no actuators, no mechanically moving components, no membranes that would have to be deflected or the like. On the contrary, the device is based on purely passive thermal valve technology, which makes it very inexpensive to produce and very sturdy to operate.

In the device according to the invention, the microfluidic channel structure and the actual valve logic are configured separately from each other. Consequently, both of these two components can be constructed separately from each other and their production processes can be optimized separately. If one of the two components is functioning, then the other one can be retained. This is of special interest since the microfluidic structure, particularly when it is to be used for biomedical applications, has to be replaced frequently. However, this is only a minute part of the costs of the entire system. The actual costs arise from the valve logic, that is to say, the heat sources and the heat sinks as well as their actuation; this valve logic, however, can be reused since it does not become contaminated during operation.

The device according to the invention can be scaled as desired. For the production of heat sources on electronic circuits, there are already now numerous manufacturing processes (e.g. screen printing of resistors) that are not limited to a specific surface (continuous or offset printing). The same applies to the heat sinks Consequently, the system can be expanded to any desired number of microfluidic channels without being subject to limitations in terms of their production technology.

There is no need for special physical boundary conditions, and in particular, no compressed air is needed. All that is needed is power for the heating elements and a Peltier block as a cold source.

Another advantage is that the heat management in the open state of the valve is very precisely known, since the temperature of the heating element is known when suitable heating elements are used, preferably a resistor with a known temperature-resistance characteristic curve, e.g. a semiconductor PTC or a printed circuit board heating element. The precise temperature control of the fluids being conveyed is a plus.

FIG. 1 schematically shows the structure of an individual thermal valve cell. The valve cell consists of a microfluidic channel 4, which is embedded in a microfluidic element 3 which may be made of a polymer, of silicon, of ceramic, of glass or of metal. Fluids are conveyed in the channel 4, for example aqueous solutions, mediating media or separating media of the type needed for applications in medical technology or in biotechnology. The channel 4 is configured in three dimensions in such a way that it is open at a contact point (contact zone) 5 towards the environment, or else it is closed by means of a thin wall that has a low thermal capacitance, in such a way that it preferably has a flat surface. At the contact point 5, there is a printed circuit board 2 on the element 3, preferably an etched wiring board, that is configured in such a way that the thermal transition between the printed circuit board 2 and the element 3 is small. On the printed circuit board 2, there is at least one conductor path structure 6 having a heating element 7 that is electrically connected to the conductor path structure 6 at the contact point 5, that serves as a local heat source in the valve cell, and that may be configured as an ohmic resistor or as a diode.

On the back of the printed circuit board 2, there is a cooling element 8, preferably having a flat design, that serves as a heat sink in the valve cell. Such a cooling element may include a cooling fin structure with a connected heat pipe, of a ventilation system or of a Peltier element. As an alternative, a physical or chemical cold source is used, e.g. an endothermic reaction, a cooling tank filled with liquefied nitrogen or another gas. The cooling element 8 is placed onto the printed circuit board 2 in such a way that the two components have a small thermal resistance with respect to each other.

Figure 2:
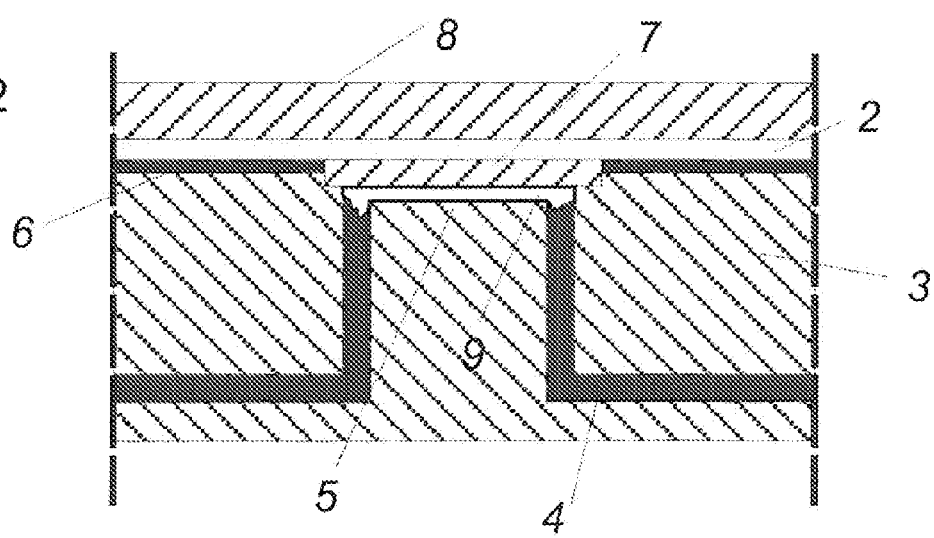
FIG. 2 shows the valve cell in the closed state.
Figure 3:
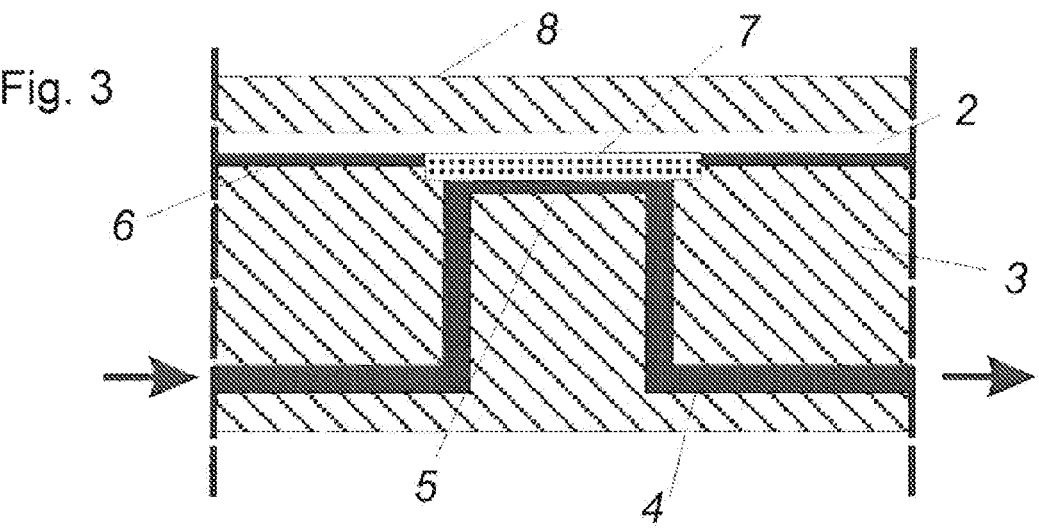
FIG. 3 shows the valve cell in the opened state.

The thermal valve cell according to this embodiment is operated as shown by way of an example in FIGS. 2 and 3. The valve cell is a valve of the type that is closed in its normal state. As a result, the heat input takes place much more quickly than the heat output, so that the valve is much faster during the switch-on procedure.

FIG. 2 schematically shows the closed state of a single thermal valve cell. While the valve cell is in the closed state, the cooling element 8 remains in constant operation, whereas the heating element 7 is switched off. As a result, at the contact point 5 of the channel 4 that is closest to the cooling element 8 at this point, a local icing of the channel 4 occurs, as a result of which the fluid conveyed through the channel 4 is frozen and thus serves as a precisely fitting closing element 9 of the channel 4.

As shown in FIG. 3, in order to open the valve cell, current is applied via the electric conductor path structure 6 to the heating element 7, thereby heating it up. As a result, the closing element 9 that is configured as shown in FIG. 2 and that was created by the local icing of the channel 4 at the contact point 5 is eliminated, whereby the heat dissipation out of the contact point 5 is compensated for by the cooling element 8. Consequently, the microfluidic channel 4 is opened again and the fluid can flow through the valve.

Starting with the structure of a single thermal valve cell, the concept of fluidic multiplexing is described below by way of an example, which allows the free switching of a plurality of fluidic channels. The concept of multiplexing is known from the realm of electronics. Multiplexers are used to connect a large number of signal lines to a small number of control lines. Here, the exponential relationship applies that n control lines can switch $2^n$ signal lines. Thus, in the case of a 3-bit multiplexer, $2^3=8$ signal lines can be controlled, and with a 10-bit multiplexer, $2^{10}=1024$ signal lines can be controlled. A microfluidic multiplexer achieves similar results for the fluidics. Here, a signal line corresponds to a microfluidic channel that is to be controlled, e.g. channel 4 from FIG. 1. The following examples are described on the basis of a 3-bit fluidic multiplexer, but the underlying concept here can be applied to any number of control lines, especially 10 bits and more.

Figure 4:
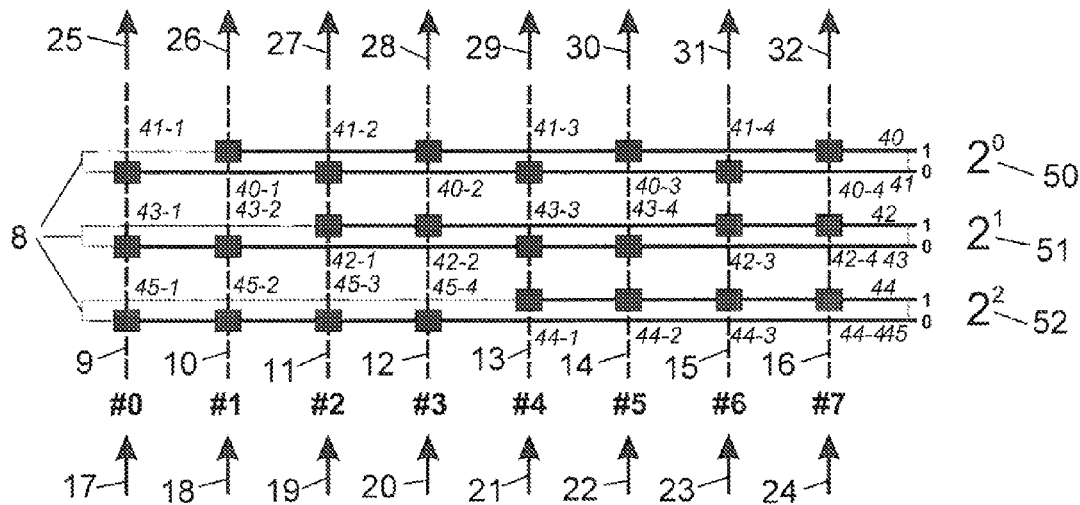
FIG. 4 shows a mode of operation of a 3-bit fluidic multiplexer.

FIG. 4 schematically shows the structure of a 3-bit fluidic multiplexer that, to start with, consists of the same components of the type described for the single thermal valve cell in FIG. 1. This arrangement likewise comprises a cooling element 8, a microfluidic element 3 and a printed circuit board 2, on which here, however, there is not only a single heating element 7 on a single conductor path structure 6, but rather a plurality of heating elements 40-1 to 40-4, 41-1 to 41-4, 42-1 to 42-4, 43-1 to 43-4, 44-1 to 44-4 and 45-1 to 45-4, which are distributed here over a total of six individual conductor paths 40 to 45, which are each combined in pairs (conductor paths 40, 41 and 42, 43 and 44, 45).

The elements 40 to 45 of the specified pairs are each associated with a logical switching status: the conductor paths 40, 42, 44 form the logical TRUE lines, whereas the conductor paths 41, 43, 45 form the logical FALSE lines. In each case, one logical TRUE line and one logical FALSE line yield in total one control line: the lines 40, 41 form the $2^0$ control line 50, the lines 42, 43 form the $2^1$ control line 51, while the lines 44, 45 form the $2^2$ control line 52.

The control lines 50 to 52 each know the logical switching status TRUE or FALSE. For example, in order for the control line $2^0$ to be in the status TRUE, current has to be applied to the printed circuit board 40, as a result of which the heating elements 40-1 to 40-4 would heat up. However, in order for the control line $2^0$ to be in the status FALSE, a current has to be applied to the conductor path 41, as a result of which the heating elements 41-1 to 41-4 would heat up. Consequently, a control line 50 to 52 can always represent only either the switching status TRUE or the switching status FALSE, never both; thus, only one of the two associated conductor paths is energized at a time.

In contrast to single thermal valve cells, the 3-bit fluidic multiplexer also has an elevated number of microfluidic channels that are to be switched, namely, $2^3=8$ channels 9 to 16, which are also designated as #0 to #7. Each of the channels 9 to 16 has a correspondingly configured inlet 17 to 24 and a correspondingly configured outlet 25 to 32. The arrangement is configured in such a way that the individual microfluidic channels 9 to 16 are situated analogously to the thermal contact point 5 shown in FIG. 1 between the channel 4 and the cooling element 8 as well as the electrical conductor path structure 6. Furthermore, the body of the 3-bit fluidic multiplexer is configured in such a way that the tripartite contact zone shown in FIG. 4 is coupled to the cooling element 8.

Figure 5:
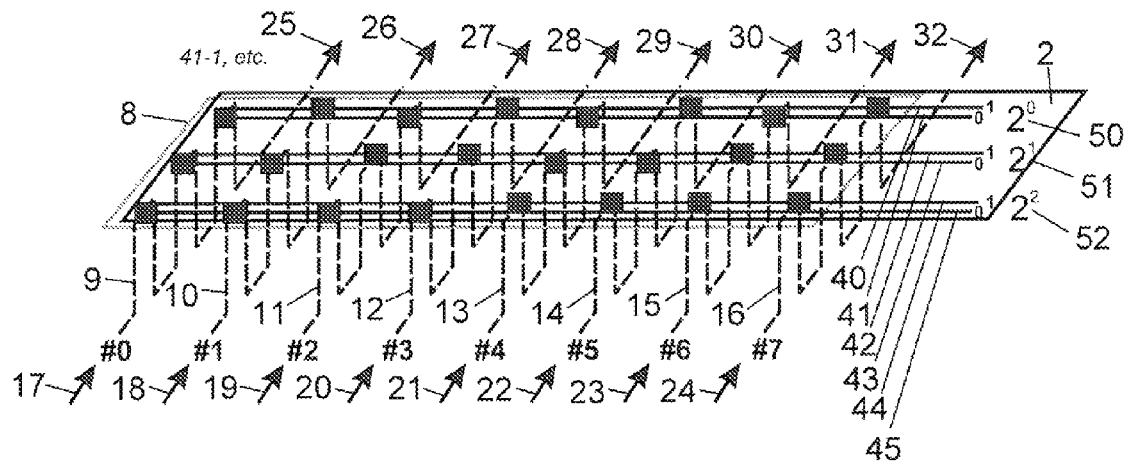
FIG. 5 shows a structure of a 3-bit fluidic multiplexer.

FIG. 5 schematically shows a three-dimensional configuration of the 3-bit fluidic multiplexer, which is analogous to the structure of the single thermal valve cell. In addition to what is shown in FIG. 4, here in FIG. 5, the cooling element 8 and the printed circuit board 2 are also shown.

Below, the operation of the arrangement according to the invention will be described with reference to the example of a 3-bit fluidic multiplexer.

Figure 6:
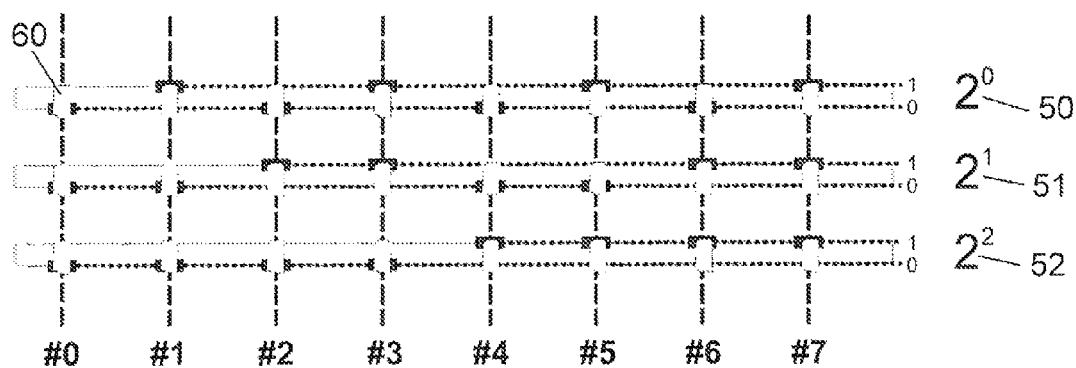
FIG. 6 shows the 3-bit fluidic multiplexer in the closed state.

FIG. 6 shows the 3-bit fluidic multiplexer in the closed normal state. For this purpose, analogously to the operation of the single thermal valve cell, the cooling element 8 is operated constantly, while the individual microfluidic channels 9, 10 freeze at their contact points with the heat source, i.e. at each of the points where the heat sources 40-1 to 40-4, 41-1 to 41-4, 42-1 to 42-4, 43-1 to 43-4, 44-1 to 44-4 and 45-1 to 45-4 are arranged, thus forming a closing element 60 due to local icing.

Figure 7:
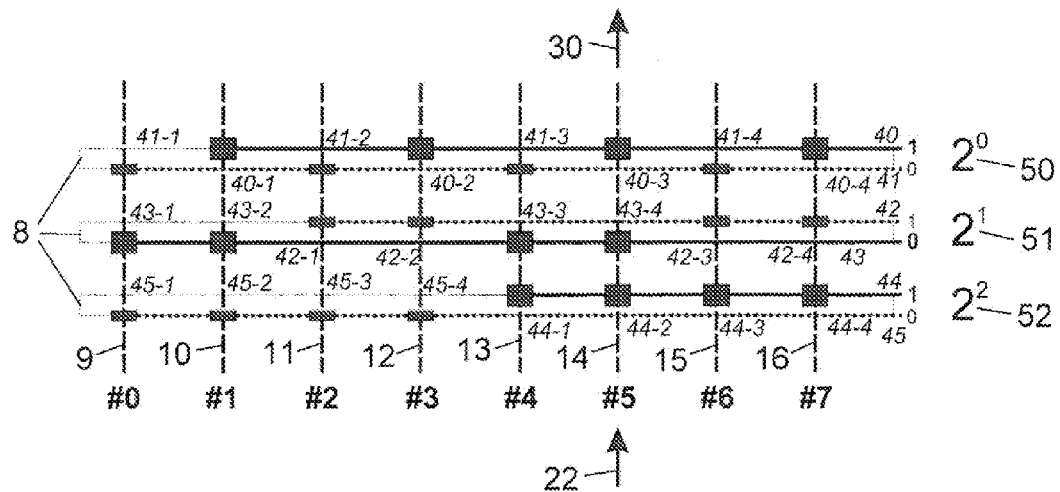
FIG. 7 shows the 3-bit fluidic multiplexer after the digital signal 101 has been applied.

FIG. 7 shows how one of the microfluidic channels 9 to 16 can be opened by applying a digital signal to the $2^0$ to $2^2$ control lines 50 to 52. For this purpose, the binary signal 101, corresponding to the number 5 in decimal notation, is used as an example. In order to do this, a logical TRUE is applied to the $2^2$ control line 52, a logical FALSE is applied to the $2^1$ control line 51 and a logical TRUE is applied to the $2^0$ control line 50. In this manner, the conductor paths 40, 43 and 44 are energized and the heating elements 40-1 to 40-4, 43-1 to 43-4, and 44-1 to 44-4 connected thereto heat up.

Figure 8:
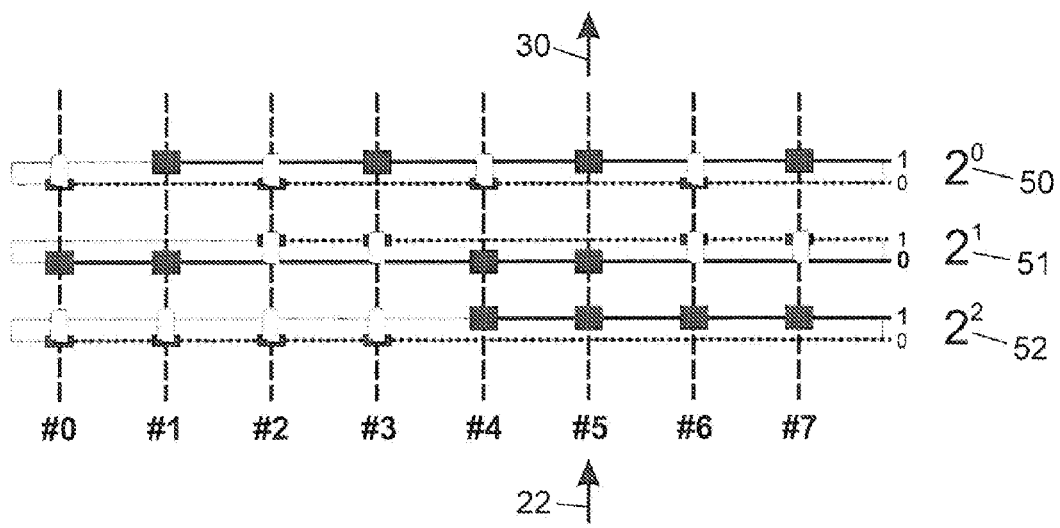
FIG. 8 shows that of FIG. 7, with areas that remain frozen.

FIG. 8 shows what happens when the local icing has melted above the heated heating elements and the microfluidic channels in this area open up again. Here, each of the microfluidic channels has to pass all three control lines 50 to 52. Only when each of the intersections of the appertaining channel is opened with each of the three control lines can a flow be established leading from the inlet of the appertaining microfluidic channel to the outlet of the corresponding microfluidic channel. The design of the fluidic multiplexer ensures that only one single microfluidic channel—in the case shown in FIG. 7 the channel 14 or #5, analogously to the digital control signal 101—is open at all three intersections. All of the remaining microfluidic channels are still iced and thus closed at least one of the intersections between the channel and one of the control lines 50 to 52.

Such an arrangement is thus able to use a purely passive device to switch almost any desired number of microfluidic channels. In comparison to the single thermal valve cell in which every single valve cell is associated with an individual control line, the microfluidic multiplexer has the major advantage that the number of controllable microfluidic channels increases exponentially; each additional control line doubles the number of controllable channels. Such a complexity cannot be achieved by a simple 1-to-1 control of the type implemented in almost all microfluidic valve systems.

While the invention has been particularly shown and described with reference to preferred embodiments thereof, it will be understood by those skilled in the art that various changes in form and details may be made therein without departing from the spirit and scope of the invention.

The invention claimed is:

1. A device for controlling a flow of fluids through $n=2^m$ microfluidic channels, m being at least 3, the device comprising:
    a substrate including the microfluidic channels therein, each channel having m contact points;
    a cooling element configured to cool fluid disposed in the contact points of each of the n microfluidic channels;
    a respective heating element corresponding to each contact point, each heating element be configured to heat fluid disposed at the respective contact point;
    m control lines, each control line being associated with a respective one of the contact points of each of the n microfluidic channels, each control line being operable to activate and deactivate the n heating elements corresponding to the respective n contact points, each control line comprising a pair of conductor paths including:
        a first conductor path structure that is in contact with a first half of the respective n heating elements associated with the respective control line so as to activate the first half of the respective n heating elements when the respective control line is set to a switching status TRUE, and
        a second conductor path structure that is in contact with a second half of the respective n heating elements associated with the respective control line so as to activate the second half of the respective n heating elements when the respective control line is set to a switching status FALSE.

2. The device as recited in claim 1, further comprising a circuit board on which the conductor path structures are disposed, the board circuit being adjacent to the cooling element.

3. The device as recited in claim 2, wherein each of the microfluidic channels is open with respect to the circuit board at each corresponding contact point.

4. The device as recited in claim 2, wherein each of the microfluidic channels includes a thin wall at each corresponding contact point, so as to close the microfluidic channels in a vicinity of the respective contact points with respect to the circuit board.

5. The device as recited in claim 1, wherein each of the heating elements includes at least one of an ohmic resistor and a diode.

6. The device as recited in claim 2, wherein each of the heating elements includes at least one of an ohmic resistor and a diode.

7. The device as recited in claim 3, wherein each of the heating elements includes at least one of an ohmic resistor and a diode.

8. The device as recited in claim 4, wherein each of the heating elements includes at least one of an ohmic resistor and a diode.

9. The device as recited in claim 1, wherein the cooling element includes at least one of a cooling fin structure connected to a heat pipe, a ventilation system and a Peltier element.

10. The device as recited in claim 2, wherein the cooling element includes at least one of a cooling fin structure connected to a heat pipe, a ventilation system and a Peltier element.

11. The device as recited in claim 3, wherein the cooling element includes at least one of a cooling fin structure connected to a heat pipe, a ventilation system and a Peltier element.

12. The device as recited in claim 4, wherein the cooling element includes at least one of a cooling fin structure connected to a heat pipe, a ventilation system and a Peltier element.

13. The device as recited in claim 5, wherein the cooling element includes at least one of a cooling fin structure connected to a heat pipe, a ventilation system and a Peltier element.

* * * * *